INVENTORS
AMARNATH P. DIVECHA
& PAUL J. LARE

United States Patent Office 3,833,697
Patented Sept. 3, 1974

3,833,697
PROCESS FOR CONSOLIDATION AND EXTRUSION OF FIBER-REINFORCED COMPOSITES
Paul J. Lare, Bowie, Md., and Amarnath P. Divecha, Falls Church, Va., assignors to Melpar, Inc., Falls Church, Va.
Filed Feb. 14, 1969, Ser. No. 799,329
Int. Cl. C04b 33/32, 35/72
U.S. Cl. 264—60
10 Claims

ABSTRACT OF THE DISCLOSURE

A fiber-reinforced metal composite of desired shape is produced by consolidating a mixture of the metal matrix and the fibers under pressure with the mixture maintained at a temperature above the solidus of the matrix system. Following the desired consolidation, the composite is extruded by lowering its temperature to a value in the range from 90% to 98% of the melting point of the matrix, and increasing the pressure to a value exceeding the consolidation pressure. To permit extrusion of the just consolidated body, the press in which consolidation is performed contains a die cavity plugged by an extrudable seal.

BACKGROUND OF THE INVENTION

The present invention relates generally to the reinforcement of metal matrices with high-strength ceramic fibers or whiskers, coated or uncoated with suitable metals, and more particularly to apparatus and processes for incorporation of the fibers in the matrix using a continuous method of consolidation and extrusion inherently producing a preferred fiber orientation.

In the co-pending application of Divecha et al., Ser. No. 626,190, filed Mar. 27, 1967, now U.S. Pat. No. 3,441,-392 entitled "Preparation of Fiber-Reinforced Metal Composites by Compaction in the Liquid-Phase," of common assignee herewith, there are discussed several prior art methods of producing fiber-reinforced composites, and it is observed that one of the principal problems encountered in obtaining fiber-reinforced metal composites has been the dearth of processes capable of producing specimens in sizes sufficiently large for practical use and for meaningful evaluation of working characteristics.

One basic requirement in the production of the successfully reinforced composite is the capability of the composite to transfer load from one whisker or fiber to another. Another requirement is that there be a strong bond between the whisker-matrix interface. Wetting of the fibers by the matrix is also essential, and it has been found for example, that pure molten nickel bonds to alumina fibers under prolonged contact of about thirty minutes or more, and that addition of slight amounts of chromium (approximately one percent) also enhances wetting of the fibers.

In one prior art method of producing a whisker-reinforced composite, the whiskers are hand sorted, and manually placed in a uniaxial orientation, after which molten metal is forced into the aligned whisker bundle and allowed to solidify. Obviously, this hand packing technique is laborious and time consuming, and because of the extremely short period during which the whiskers are exposed to the molten metal, the process is of marginal reliability in that there is no assurance of a strong interface bond. Additional disadvantages of this method are that only composite structures of relatively small size can be produced, and the properties of the composites are not readily reproducible.

In the process disclosed in the aforementioned Divecha et al. application, compaction is performed at temperatures at which the metal matrix is maintained in its semi-molten region. More specifically, the matrix material is mixed in powder form with the coated or uncoated fibers, the latter in loose separated form, and the resulting mixture placed in the die of a conventional hot-pressing apparatus where it is heated to a temperature slightly below the solidus of the system. At that point, a predetermined constant pressure is applied to the metal matrix-fiber system and the temperature of the composite is then raised until the state of the system experiences a cross-over into the semi-molten region of the matrix. Pressure is maintained until desired compaction is achieved, the matrix completely encapsulating the fibers to assure a strong bond therewith, after which the composite is cooled and removed, and hot rolled to produce a preferred fiber orientation. Prior to the hot rolling operation, the process produces dense bodies consisting of randomly oriented whiskers in the metal matrix. In order to retain the liquid metal within the die cavity while the composite is under pressure at consolidation temperatures, extremely close tolerances are maintained between the solid punch and die cavity of the press mechanism.

While this process, as disclosed in detail in the aforementioned Divecha et al. application, is highly advantageous over processes disclosed in the art prior thereto, it is not without its limitations. In particular, while the composites produced are substantially larger than those produced by earlier-employed techniques, they are nevertheless still of relatively small size, necessarily limited by existing mechanical apparatus. For example, such structural shapes as rods, I-beams, tubing and channels are not readily fabricated by this process because of the usual size requirements of those articles. In addition, a hot rolling step is ultimately necessary to insure substantial whisker orientation in the preferred direction. The process is best employed to produce solid cylindrical shapes as an initial product prior to further machining or other processing. Other shapes may be produced, but are less desirable economically because of special die designs and variation of existing apparatus, as well as machining and material cost and availability.

It will be appreciated from these considerations that a desirable process would include the extrusion of the composite into usable structural shapes. It has been proposed that a slurry extrusion process be utilized for this purpose in which the whisker-metal powder mixture is blended with an organic material. The entire fiber-powder-organic system is then placed in the die cavity, the die containing several orifices, through which the materials may be extruded under pressure into rods or wires of relatively small diameter, e.g., .020 inch. After the consolidation has been performed in the press under pressure, the organic binders are removed by heat treatment at extremely high temperatures. The principal disadvantages of such a process are: (a) inability to completely remove the organic binder from the final product, with resulting impairment of the consolidation characteristics; (b) adverse effect of the remaining organic binder on the ductility of the matrix; (c) production of undesirable decomposition products as a result of the heat treatment required to achieve at least partial removal of the organic binder, these products hindering and, in some instances, completely destroying the matrix-whisker bonding; and (d) requirement of much higher pressures, e.g., 16,000 p.s.i., to achieve consolidation of the degraded matrix than are necessary using hand packing or the aforementioned Divecha et al. process, with attendant greater incidence of fiber fracture.

In the aforementioned hand-sorting and packing method, the composite product is complete immediately following the consolidation cycle. Further fabrication or processing, such as by rolling or extrusion, is impractical if not impossible because of the small size and existing preferred whisker orientation. In any event, the size limitations on the resulting composites preclude economical use of the hand-packing processes for any large-scale production.

It is, of course, entirely permissible to perform extrusion of a composite billet prepared by the process disclosed in the aforementioned Divecha et al. application, but the extrusion process would necessarily require the additional steps normally associated with that type of process; that is to say, the steps of transferring the billet to another die, heating to the requisite temperature in a separate apparatus, and so forth.

Accordingly, it is the principal object of the present invention to provide improved apparatus of and processes for consolidation and extrusion of fiber-reinforced composites, which overcome the disadvantages and limitations of prior art apparatus and processes therefor.

It is a more specific object of the present invention to provide a single continuous method by which to incorporate and fabricate aligned whisker reinforced composites in usable structural shapes, using metal or metal alloy powders.

SUMMARY OF THE INVENTION

Briefly, in accordance with the present invention, a process for producing fiber-reinforced composites is performed in a single continuous operation in which extrusion of the composite into the desired shape immediately follows consolidation of the fiber-matrix system into the reinforced composite, without the requirement of transfer of the composite to another press.

The press includes a die cavity having one or more orifices each of which is normally closed by a seal of sufficient rigidity to withstand consolidation pressure exerted on the fiber-matrix system, but which seal is itself adapted to undergo extrusion to permit the just consolidated body to be extruded via the respective die orifice (also termed the extrusion port).

After the green fiber/powder mixture is placed into the die, the entire assembly is heated slowly from room temperature to a temperature slightly above that at which the solidus of the matrix is supported, i.e., to a temperature at which the matrix is in the liquid phase or in a semi-molten state. During this period, the system is maintained under relatively low pressure in the range from approximately 2000 to approximately 5000 pounds per square inch (p.s.i.), in similar manner as disclosed in the aforementioned Divecha et al. application, until the desired consolidation is achieved. However, in accordance with the present invention, upon conclusion of the consolidation cycle the temperature is reduced to a value between the solidus and the matrix melting point (a state which may be characterized as a "mushy" phase), and the pressure on the consolidated system or composite is increased to a value sufficient to rupture the seal and to extrude the composite via the extrusion port. This range of temperature values, at which pressure in excess of the consolidation pressure is applied to the composite for extrusion thereof, is critical.

In particular, extrusion is performed at a temperature at which the shear strength and tensile strength of the matrix are sufficiently low to permit ready flow of the matrix material, such that the fibers are merely carried with the matrix in the direction of matrix deformation. While the precise temperature is dependent upon the character and concentration of the fibers or whiskers, it resides in a relatively narrow range quite close to the melting point of the matrix.

BRIEF DESCRIPTION OF THE DRAWINGS

The above and still further objects, features and related advantages of the present invention will become apparent from a consideration of the following detailed description of a preferred process according to the invention and of an extrudable seal for use therewith. For such description reference will be made to the accompanying drawings, in which.

DESCRIPTION OF PREFERRED PROCESS AND EMBODIMENT

Figure 1:
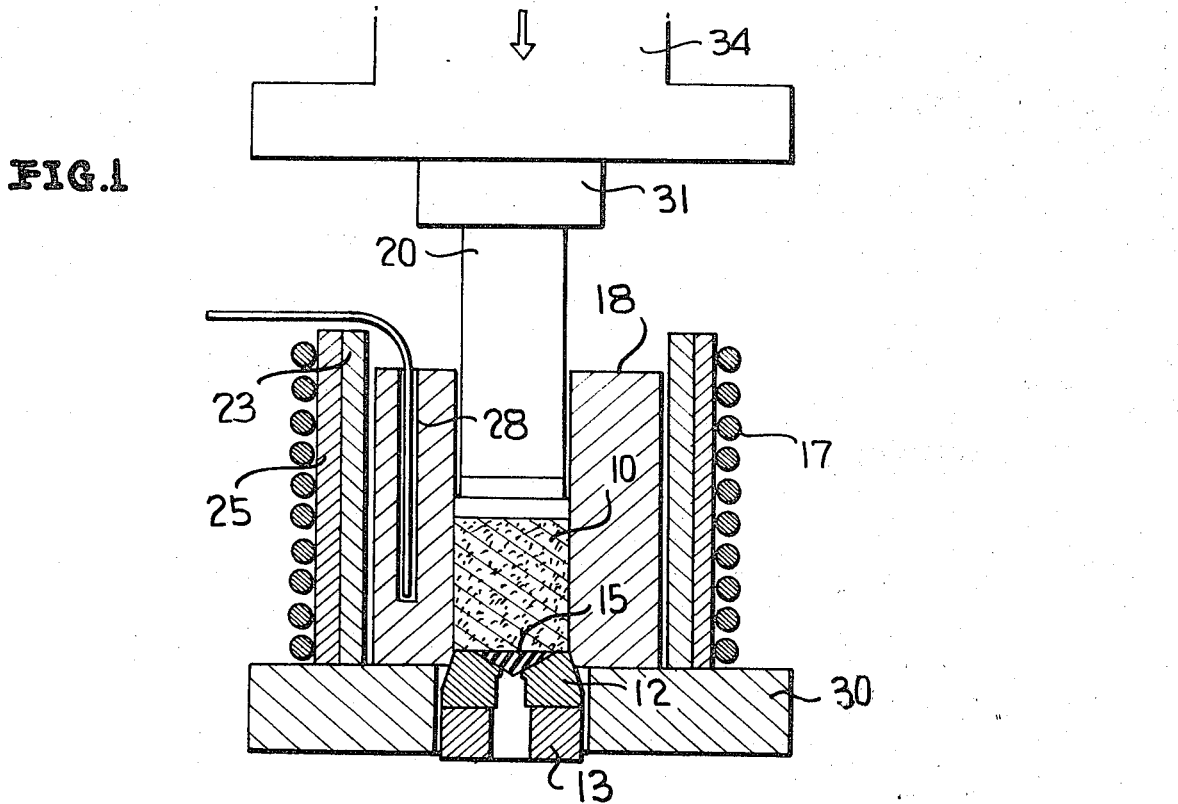
FIG. 1 is a simplified schematic sectional view of the hot-pressing apparatus, i.e., the press and related heat exchange devices.

Suitable fibers (whiskers) for use in reinforcing the metal matrix include alpha alumina, such as sapphire, and silicon carbide (alpha-SiC), of diameters ranging upwardly to approximately 30 microns and of lengths up to about one-half inch. The fibers may be either coated or uncoated, or both. One example of a suitable coated fiber is sapphire electroplated with nickel. Such fibers are available from several sources, one of which is Thermokinetic Fibers, Inc. of Nutley, N.J. Since processes for producing these types of fibers are well known in the art, they may also be fabricated locally where appropriate facilities exist.

In the preparation of each fiber-reinforced metal composite by compaction or consolidation in the liquid or semi-molten phase of the matrix, the use of an alloy as the matrix is preferred over the use of a pure metal, since liquid phase hot pressing requires a system having a distinct two-phase region (e.g., liq.+$\alpha$). Either mixtures or prealloyed powders of the matrix components may be utilized, but the prealloyed powder has the advantage of a known distinct melting point, whereas the melting point of the mixture must usually be ascertained by experimentation. Moreover, with the prealloyed powder there is less probability of producing a non-homogeneous structure as a result of the formation of an undesirable intermetallic phase during heating and compaction.

Some of the many suitable mixed and prealloyed powders for preparation of the fiber-reinforced composite include Al-Si minus 325 mesh prealloyed atomized powder, which is composed of 10.2 Si, 0.03 Mg, 0.16 Fe, balance Al (percentages given by weight); Al-Cu minus 325 mesh prealloyed atomized powder composed of 4.5 Cu, balance Al; 7075 Al minus 325 mesh prealloyed atomized powder composed of 0.3 Si, 0.6 Fe, 2.1 Cu, 0.2 Mn, 2.2 Mg, 0.2 Cr, 0.01 Ni, 4.7 Zn, balance Al (all of the foregoing powders available from Reynolds Aluminum Company, Richmond, Va.); Nichrome 80 Ni-20 Cr minus 325 mesh prealloyed atomized powder; silicon 98 Si, balance impurities minus 325 mesh elemental silicon (the latter two powders available from Consolidated Astronautics, New York); nickel 99.7 Ni, balance impurities, 4–7 microns, prepared by carbonyl process (available from International Nickel Company, New York); and cast nickel minus 325 mesh prealloyed atomized powder, composed of 1 Si, 1 Mn, balance Ni (available from Hoegannes Sponge Iron Co., of New Jersey).

The following is an example of a process according to the invention, in which SiC fiber reinforced Al-Si composite is prepared and extruded.

After the SiC fibers have been dispersed or separated in known manner, as by agitation in isopropanol, —400 mesh Al-2.5 Si (percent by weight) prealloyed powder or mixed powder is added to the resulting slurry in an amount to produce a metal matrix containing 15% by volume of SiC fibers. Preferably, the fibers have diameters in the range from 1 to 3 microns and lengths up to about one-half inch. The constituents of the fiber-matrix are thoroughly mixed by stirring or agitation for a period of about two minutes, during which the mixture is filtered by aspiration through #31 Whatman paper. In order to achieve superior distribution of the composite components, particularly at higher (than 15% by volume) fiber concentration, it is advantageous to use an oriented fiber-matrix mixture. This may be achieved by depositing a thin film of a magnetic material (e.g., Ni) on the fibers by chemical decomposition of a volatile compound (e.g., $Ni(CO)_4$). The metallized whiskers are then dispersed with the matrix powder to produce a slurry in isopropanol as described earlier. The aligned green body is then obtained by filtration through Whatman #51 in a magnetic field. The metallized fibers act as dipoles and align readily.

The mixture is then dried for compaction or consolidation in hot pressing apparatus such as that shown in FIG. 1. The matrix-fiber mixture 10 is inserted into a die cavity closed by backing plates or blocks 12 and 13 having aligned orifices conforming in shape to the desired shape of the final extruded composite. The orifice or extrusion port in plate 12, forming the lower wall of the die cavity, is plugged by an extrudable seal 15, a component constituting an important feature in carrying out processes according to the invention.

The following properties are essential to render the seal extrudable (or rupturable) after consolidation of the fiber-matrix mixture, as will be described presently. The seal should have a melting point higher than that of the matrix alloy, with a ductility superior to that of the composite. The shear strength of the seal at consolidation temperature must be sufficient to withstand the consolidation pressure on the fiber-matrix mixture, without rupture. The seal configuration is related to the immediately preceding property, in that the configuration should permit retention of physical integrity throughout consolidation, with no loss of liquid metal. For the latter reason, it is preferred that the seal have a solid conical shape with its base forming a portion of the surface of the die cavity. However, other shapes are also suitable, such as a flat disk or a nozzle-like configuration. Preferably, the seal is composed of a high purity metal corresponding to the richest component in the alloy matrix. For example, in the case of the Al-2.5 Si alloy used in the exemplary process being described, seal 15 should be fabricated of high purity aluminum.

The press of FIG. 1 is heated by induction via coil 17. Low melting alloys such as aluminum-silicon are processed using a tool steel die 18, whereas matrices such as nickel-silicon and nichrome are preferably processed with die 18 composed of graphite. Even in the case of the low melting alloys it is desirable to employ a plunger or ram 20 and block 12 of graphite to prevent seizing. Moreover, for a steel die, the walls of the die cavity may be coated with suitable lubricant such as molybdenum disulfide to permit rapid ejection and complete extrusion of the composite following consolidation thereof.

The die may be encompassed by graphite layer 23, and encased in fused silica tube 25, as is typical of a conventional laboratory hydraulic press. Induction heating coil 17 is wound about the silica tube, and a temperature sensing element such as a thermocouple 28 extends into a recess within die 18 to allow monitoring the temperature of the press at a point in close proximity to the fiber-matrix mixture. While a slight space between temperature sensor and die is shown in the figure, in practice the sensor should be in direct heat conductive contact with the die.

The press further includes a support or base 30 of dense refractory brick, and an alumina block 31 disposed between plunger 20 and a hydraulic ram 34. It is to be emphasized that the press is of conventional structure except for the provision of extrudable seal 15.

After insertion of whisker-alloy mixture 10 into the die cavity, the mixture is slowly heated to a temperature slightly below the solidus of the matrix system. At that point, a pressure of approximately 2000 p.s.i. is applied to the mixture and the temperature is raised above the solidus to produce the semi-molten phase (liq.+$\alpha$) of the matrix. In the particular example of matrix and whisker materials and concentrations presently being discussed, in which Al-2.5 w/o Si-15 v/o SiC (i.e., 2.5% by weight of silicon, 15% by volume of SiC fibers) composite is to be produced, the latter temperature is in the range from approximately 575 to 585° C. A precise indication of attainment of this temperature is its accompaniment by a sudden drop in pressure at the point of crossover into the (liquid+$\alpha$) semi-molten phase. Pressure is thereupon returned to 2000 p.s.i. and maintained in the range from about 2000 to about 5000 p.s.i. during the consolidation portion of the process.

Care should be exercised to insure maintenance of press temperature below the liquidus, to prevent metal from squeezing out of the die cavity about the ram and dummy block at the lower end of the ram, in which event a large percentage of the fibers would also be carried away.

Densification of the composite is continued at the relatively low range of pressures mentioned above until desired compaction is achieved. At the conclusion of the consolidation cycle, extrusion of the dense composite is achieved by lowering the temperature of the composite to a point between the solidus and the matrix melting point and increasing the pressure over that employed for consolidation sufficiently to rupture the seal and extrude the composite. These temperature points are shown in terms of percentage of melting point of the matrix in the graph of FIG. 2.

Figure 2:
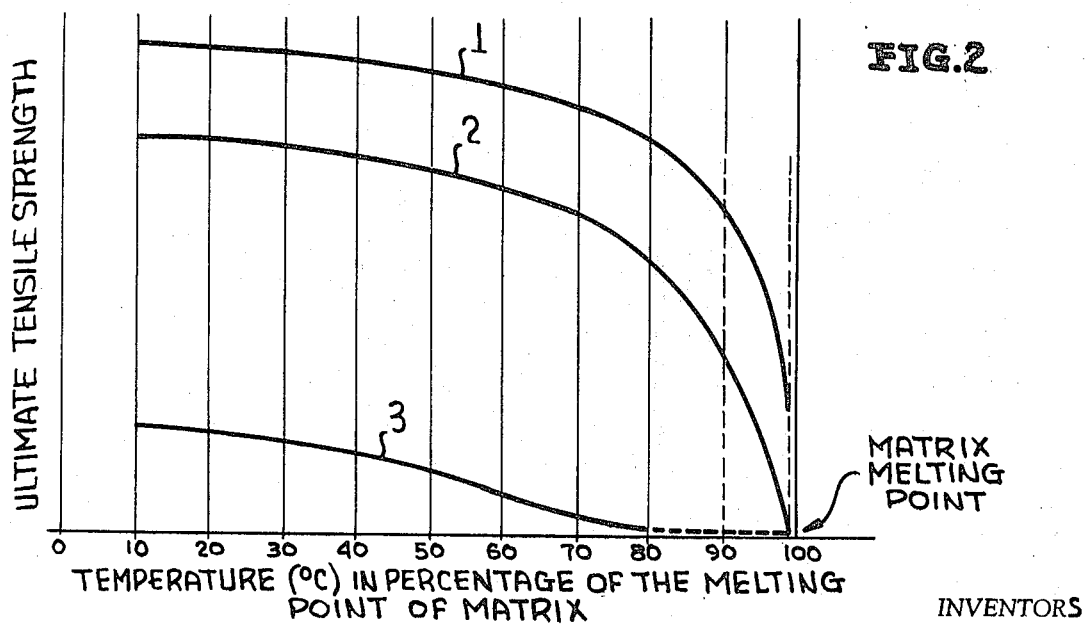
FIG. 2 is a graph of tensile strength versus temperature (in percentage of matrix melting point) for various concentrations of fibers in the total composite.

It is essential that extrusion be performed at a temperature in the aforementioned range. At such temperatures the matrix has shear and tensile strength sufficiently low to allow ready plastic flow of the matrix material, during which the fibers are carried with the matrix in the direction of matrix deformation. Fiber damage is quite minimal in comparison with prior art methods of working the consolidated composite to produce the desired shape, because of the extremely low shear strength of the matrix at the extrusion temperature. The precise extrusion temperature, which lies in a relatively narrow range close to the melting point of the matrix, will depend upon the character and concentration of the fibers, as is illustrated in the chart of FIG. 2. Curves 1, 2, and 3 depict the Al-Si composite with 25 v/o SiC fibers, with 15 v/o SiC fibers, and without reinforcement (no fibers), respectively.

It will be observed by reference to FIG. 2 that a sudden drop in strength of the fiber-reinforced composites occurs at about 90% to about 98% of the matrix melting point, depending on fiber concentration, alignment and aspect ratio. On the other hand, it is noted that the unreinforced matrix (curve 3) possesses little if any strength in this temperature range, or at any temperature greater than 0.8 homogolus. Extrusion temperature in the narrow range from 95% to 98% of matrix melting point is preferred. We have found that at lower extrusion temperatures, for example at 70% of the melting point of the matrix, extrusion causes significant fiber damage. Otherwise, in the finally extruded state, the fibers behave as efficient reinforcing agents because the matrix possesses sufficient shear strength to cause load transfer to the fibers. The extruded composite is usable at practically any temperature below that at which extrusion was effected.

Regardless of the initial orientation in the composite (or billet), the alignment of fibers in the extruded product is converted to uniaxial orientation parallel to the direction of extrusion because of the plastic flow of the matrix. However, since the deformation of the composite is effected in a plane perpendicular to the plane of fiber orientation, the strength of the billet being extruded is one-half to one-third that of a composite stressed in the direction of the fiber orientation. This is advantageous because the pressure at which the consolidated body begins to extrude without undue fiber damage may be maintained at a relatively low value, in the range from 8000 to 15,000 p.s.i. for the composite under discussion in the exemplary process, the lower value pertaining to a preferentially oriented billet prepared from magnetically aligned fiber-powder mixture. Moreover, the final extruded product has a strength approaching that of a mechanically worked composite in which the fibers are initally uniaxially oriented.

Utilization of extrusion temperatures slightly greater than those at which a composite having uniaxially oriented fibers loses strength further insures retention of the largest possible fiber aspect ratios. Consequently the extruded product possesses substantial reinforcing qualities in use at high temperatures approaching even the melting point of the matrix.

If desired, the seal may be composed of a suitable material to permit cladding of the extruded composite, for matrix systems requiring protection from stress corrosion.

We claim:

1. Process for producing ceramic fiber reinforced metal alloy composites, comprising: consolidating in a die-cavity of a press wherein said cavity has an extrudable seal, a mixture of metal alloy powder as a matrix material having a particle size smaller than approximately 325 mesh and up to approximately 25% by volume of a ceramic fiber or whisker having diameters of up to approximately 30 microns and lengths of up to approximately 0.5 inch under pressure after heating the mixture to a temperature slightly below the solidus of said metal alloy matrix material in degrees centigrade, then raising the temperature of said mixture above said solidus to a temperature above 90% of the melting range of said metal alloy matrix material in degrees centigrade while maintaining said pressure to produce crossover of said metal alloy matrix material into the semi-molten phase, at which point a sudden reduction in pressure is experienced, thereafter increasing the pressure to at least its former value until the desired consolidation of said metal alloy and said ceramic fiber is achieved, reducing the temperature to a value in the range from 90% to 98% of the melting range of said metal alloy matrix material in degrees centigrade, and extruding the resulting composite at a pressure exceeding the consolidation pressure and sufficient to extrude said extrudable seal, said seal having a melting temperature higher than the melting range of said metal alloy matrix material in degrees centigrade, and a shear strength sufficient to withstand the pressure used to consolidate the fiber-metal alloy matrix composite without rupturing, said ceramic fiber or whisker having a melting range above the solidus of said metal alloy matrix.

2. The process according to claim 1 wherein said matrix material is selected from the group consisting essentially of 7075 Al, and alloys of Al-Cu, Ni-Cr, Ni-Si, and Al-Si.

3. Process for producing ceramic fiber reinforced metal alloy composites, comprising: consolidating, in a die-cavity of a press, wherein said cavity has an extrudable seal, a mixture of metal alloy powder as a matrix material and a plurality of ceramic fibers or whiskers under pressure, then raising the temperature of said mixture above the solidus of said metal alloy matrix material in degrees centigrade while maintaining said pressure to produce crossover of said metal alloy matrix material into the semi-molten phase, at which point a sudden reduction in pressure is experienced, thereafter increasing the pressure to approximately its former value until the desired consolidation is achieved, reducing the temperature to a value in the range from 90% to 98% of the melting range of said metal alloy matrix material in degrees centigrade, and extruding the resulting composite at a pressure exceeding the consolidation pressure and sufficient to extrude said extrudable seal, said seal having a melting temperature higher than the melting temperature range of said metal alloy matrix material in degrees centigrade, and a shear strength sufficient to withstand the pressure used to consolidate the fiber-metal matrix composite without rupturing, said ceramic fibers or whiskers having a melting range above the solidus of said metal alloy matrix.

4. Process for producing ceramic fiber reinforced metal alloy composites, comprising: consolidating, in a die-cavity of a press, wherein said cavity has a removable seal, a mixture of metal alloy powder as a matrix material having a particle size smaller than about 325 mesh and selected from the group consisting essentially of 7075 Al, and alloys of Al-Cu, Ni-Cr, Ni-Si and Al-Si, and up to about 25% by volume of a ceramic fiber or whisker having diameters of up to about 30 microns and lengths of up to about 0.5 inch under pressure after heating the mixture to a temperature slightly below the solidus of said matrix alloy material in degrees centigrade, then raising the temperature of said mixture above said solidus to a temperature above 90% of the melting range of said matrix alloy material in degrees centigrade while maintaining said pressure to produce crossover of said matrix alloy material into the semi-molten phase, at which point a sudden reduction in pressure is experienced, thereafter increasing the pressure to at best its former value until the desired consolidation of said metal alloy material and said ceramic or whisker is achieved, reducing the temperature to a value in the range from 90% to 98% of the melting range of said matrix material in degrees centigrade and extruding the resulting composite at a pressure exceeding the consolidation pressure, said seal having a melting temperature higher than the melting temperature range of said matrix alloy material in degrees centigrade, and a shear strength sufficient to withstand the pressure used to consolidate the fiber-metal matrix composite without rupturing, but insufficient to withstand extrusion pressure, said ceramic fiber or whisker having a melting range above the solidus of said matrix alloy material.

5. Process according to claim 3 wherein said consolidation pressure ranges from 2000 to 5000 p.s.i.

6. Process according to claim 5 wherein said metal alloy is essentially composed of aluminum and silicon.

7. Process according to claim 6 wherein said fibers are SiC having diameters in the range from 1 to 3 microns and lengths up to about one-half inch.

8. Process according to claim 3 wherein said fibers are selected from the group consisting of alpha alumina and silicon carbide.

9. Process according to claim 8 wherein said extrusion is performed at a temperature in the range from 95% to 98% of the melting range of said matrix in degrees centigrade.

10. Process according to claim 3 wherein the reinforcing fibers are coated with a thin film of magnetic material prior to mixing with said material, and are placed in a preferred orientation by alignment in a magnetic field after said mixing.

(References on following page)

References Cited

UNITED STATES PATENTS

| | | | |
|---|---|---|---|
| 2,849,312 | 8/1958 | Peterman | 264—108 |
| 3,428,717 | 2/1969 | Accary et al. | 264—337 |
| 3,459,842 | 8/1969 | Wakefield | 264—60 |
| 3,471,270 | 10/1969 | Carlson | 264—111 |
| 3,475,168 | 10/1969 | Battista et al. | 264—111 |
| 3,486,867 | 12/1969 | Wilson | 65—2 |
| 2,972,221 | 2/1961 | Wilke et al. | 264—109 |
| 3,047,383 | 7/1962 | Slayter | 75—201 |
| 3,167,427 | 1/1965 | Slayter | 75—206 |
| 3,177,057 | 4/1965 | Potter et al. | 65—7 |
| 3,282,658 | 11/1966 | Wainer | 75—206 |
| 3,300,331 | 1/1967 | Collins, Jr. | 264—60 |
| 3,364,975 | 1/1968 | Gruber | 106—44 |
| 3,386,918 | 6/1968 | Hough et al. | 252—63.5 |
| 3,445,361 | 5/1969 | Sicka et al. | 204—181 |
| 3,442,997 | 5/1969 | Parratt | 264—108 |
| 3,450,510 | 6/1969 | Calon | 264—60 |

OTHER REFERENCES

W. H. Sutton: "Whisker Composite Materials," an article appearing in the August 1966 issue of Astronautics & Aeronautics at pp. 46–51.

Phillip West: "Whisker Composites," an article appearing in the June 1965, issue of Materials in Design Engineering at pp. 112–116.

DONALD J. ARNOLD, Primary Examiner

U.S. Cl. X.R.

29—182.5, 182.8; 264—65, 66, 332